(12) United States Patent
Kostrzewa et al.

(10) Patent No.: US 11,012,648 B2
(45) Date of Patent: *May 18, 2021

(54) ANOMALOUS PIXEL DETECTION

(71) Applicant: FLIR SYSTEMS, INC., Wilsonville, OR (US)

(72) Inventors: Joseph Kostrzewa, Santa Ynez, CA (US); Nicholas Högasten, Santa Barbara, CA (US); Theodore R. Hoelter, Santa Barbara, CA (US); Scott McNally, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/543,300

(22) Filed: Aug. 16, 2019

(65) Prior Publication Data

US 2019/0373193 A1   Dec. 5, 2019

Related U.S. Application Data

(63) Continuation of application No. 15/685,910, filed on Aug. 24, 2017, now Pat. No. 10,425,603, which is a continuation of application No. PCT/US2016/020783, filed on Mar. 3, 2016.

(60) Provisional application No. 62/129,685, filed on Mar. 6, 2015.

(51) Int. Cl.
| | |
|---|---|
| *H04N 5/367* | (2011.01) |
| *H04N 5/235* | (2006.01) |
| *G06T 7/254* | (2017.01) |
| *G06T 5/00* | (2006.01) |
| *H04N 5/33* | (2006.01) |
| *H04N 5/365* | (2011.01) |

(52) U.S. Cl.
CPC ........... *H04N 5/3675* (2013.01); *G06T 5/005* (2013.01); *G06T 7/254* (2017.01); *H04N 5/2357* (2013.01); *H04N 5/33* (2013.01); *H04N 5/365* (2013.01); *G06T 2207/10016* (2013.01); *G06T 2207/10048* (2013.01); *G06T 2207/20021* (2013.01); *G06T 2207/20182* (2013.01)

(58) Field of Classification Search
CPC ...... H04N 5/3675; H04N 5/2357; H04N 5/33; H04N 5/365; G06T 7/254; G06T 5/005
See application file for complete search history.

(56) References Cited

U.S. PATENT DOCUMENTS

| | | |
|---|---|---|
| 6,965,395 B1 | 11/2005 | Neter |
| 7,009,644 B1 | 3/2006 | Sanchez |
| 8,189,050 B1 | 5/2012 | Hughes |
| 2003/0120365 A1 | 6/2003 | Asano |
| 2004/0233844 A1 | 11/2004 | Yu |

(Continued)

FOREIGN PATENT DOCUMENTS

| | | |
|---|---|---|
| EP | 2450849 | 5/2012 |
| WO | WO 2009/017616 | 2/2009 |

*Primary Examiner* — David F Dunphy
(74) *Attorney, Agent, or Firm* — Haynes and Boone, LLP

(57) ABSTRACT

Systems and methods are disclosed herein to detect pixels exhibiting anomalous behavior in captured image frames. In some examples, temporal anomalous behavior may be identified, such as flickering pixels exhibiting large magnitude changes in pixel values that vary rapidly from frame-to-frame. In some examples, spatial anomalous behavior may be identified, such as pixels exhibiting values that deviate from an expected linear response in comparison with other neighbor pixels.

20 Claims, 11 Drawing Sheets

(56) References Cited

U.S. PATENT DOCUMENTS

| | | |
|---|---|---|
| 2007/0046790 A1 | 3/2007 | Nakasuji |
| 2007/0196031 A1 | 8/2007 | Chen et al. |
| 2009/0322879 A1 | 12/2009 | Faber et al. |
| 2010/0002131 A1 | 1/2010 | Chen |
| 2011/0255786 A1 | 10/2011 | Hunter |
| 2012/0281123 A1 | 11/2012 | Hoda |
| 2013/0182934 A1 | 7/2013 | Topfer et al. |
| 2014/0153839 A1 | 6/2014 | Tsuzuki |
| 2016/0042500 A1 | 2/2016 | Engberg |
| 2017/0013183 A1 | 1/2017 | Masuno |

[2, 2, 2 / 2, ~, 2 / 2, 2, 2] ← 855, 320, 330

ANOMALOUS PIXEL DETECTION

CROSS-REFERENCE TO RELATED APPLICATION

This application is a continuation of U.S. patent application Ser. No. 15/685,910 filed Aug. 24, 2017 and entitled "ANOMALOUS PIXEL DETECTION," which is incorporated herein by reference in its entirety.

U.S. patent application Ser. No. 15/685,910 is a continuation of International Patent Application No. PCT/US2016/020783 filed Mar. 3, 2016 and entitled "ANOMALOUS PIXEL DETECTION," which is incorporated herein by reference in its entirety.

International Patent Application No. PCT/US2016/020783 filed Mar. 3, 2016 claims priority to and the benefit of U.S. Provisional Patent Application No. 62/129,685 filed Mar. 6, 2015 and entitled "ANOMALOUS PIXEL DETECTION" which is hereby incorporated by reference in its entirety.

TECHNICAL FIELD

The present invention relates generally to image processing and, more particularly, to detection of image defects.

BACKGROUND

Various types of imaging devices are used to capture images (e.g., image frames) in response to electromagnetic radiation received from desired scenes of interest. Typically, these imaging devices include sensors arranged in a plurality of rows and columns, with each sensor providing a corresponding pixel of a captured image frame.

From time to time, one or more pixels may exhibit anomalous behavior due to hardware imperfections, manufacturing tolerances, and/or other causes. For example, some pixels may appear to flicker from frame-to-frame. As another example, some pixels may deviate from an expected response in comparison with other pixels. Such anomalies can be distracting and provide a misleading representation of the imaged scene.

Although anomalous pixels may sometimes be recognizable by a human being viewing the resulting image frames, it is generally impractical and cumbersome to rely on human detection. Moreover, existing machine-based approaches are frequently unsatisfactory in achieving reliable detection of anomalous pixels in an efficient and rapid manner.

SUMMARY

In one embodiment, a method includes receiving first and second image frames comprising a plurality of pixels; selecting kernels of the first and second image frames, wherein each kernel comprises a center pixel and a plurality of neighbor pixels; comparing a frame-to-frame change of the center pixels with frame-to-frame changes of the neighbor pixels; and selectively detecting at least one of the center pixels as a temporally anomalous flickering pixel based on the comparing.

In another embodiment, a method includes receiving an image frame comprising a plurality of pixels; selecting a kernel of the image frame, wherein the kernel comprises a center pixel and a plurality of neighbor pixels; determining a plurality of linearity measurements based on the center pixel and the neighbor pixels; and selectively detecting the center pixel as a spatially anomalous pixel based on the linearity measurements.

In another embodiment, a system includes a memory component comprising a plurality of executable instructions; and a processing component adapted to execute the instructions to perform a method comprising: receiving first and second image frames comprising a plurality of pixels, selecting kernels of the first and second image frames, wherein each kernel comprises a center pixel and a plurality of neighbor pixels, comparing a frame-to-frame change of the center pixels with frame-to-frame changes of the neighbor pixels, and selectively detecting at least one of the center pixels as a temporally anomalous flickering pixel based on the comparing.

In another embodiment, a system includes a memory component comprising a plurality of executable instructions; and a processing component adapted to execute the instructions to perform a method comprising: receiving an image frame comprising a plurality of pixels, selecting a kernel of the image frame, wherein the kernel comprises a center pixel and a plurality of neighbor pixels, determining a plurality of linearity measurements based on the center pixel and the neighbor pixels, and selectively detecting the center pixel as a spatially anomalous pixel based on the linearity measurements.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 8A-E illustrate example pixel value calculations performed during the process of FIG. 7 in accordance with embodiments of the disclosure.

Embodiments of the present invention and their advantages are best understood by referring to the detailed description that follows. It should be appreciated that like reference numerals are used to identify like elements illustrated in one or more of the figures.

DETAILED DESCRIPTION

Techniques are provided to identify pixels exhibiting anomalous behavior in captured image frames (e.g., still image frames and/or video image frames). Such image frames may be captured in response to irradiance at one or more wavebands, such as thermal infrared, near infrared, visible light, and/or other wavelength ranges received from a scene. In some embodiments, temporal anomalous behavior may be identified, such as flickering pixels exhibiting large magnitude changes in pixel values that vary rapidly (e.g., from frame to frame). In some embodiments, spatial anomalous behavior may be identified, such as pixels exhibiting values that deviate from an expected linear response in comparison with other neighbor pixels (e.g., how well a pixel's value matches the slope of neighbor pixel values).

Figure 1:
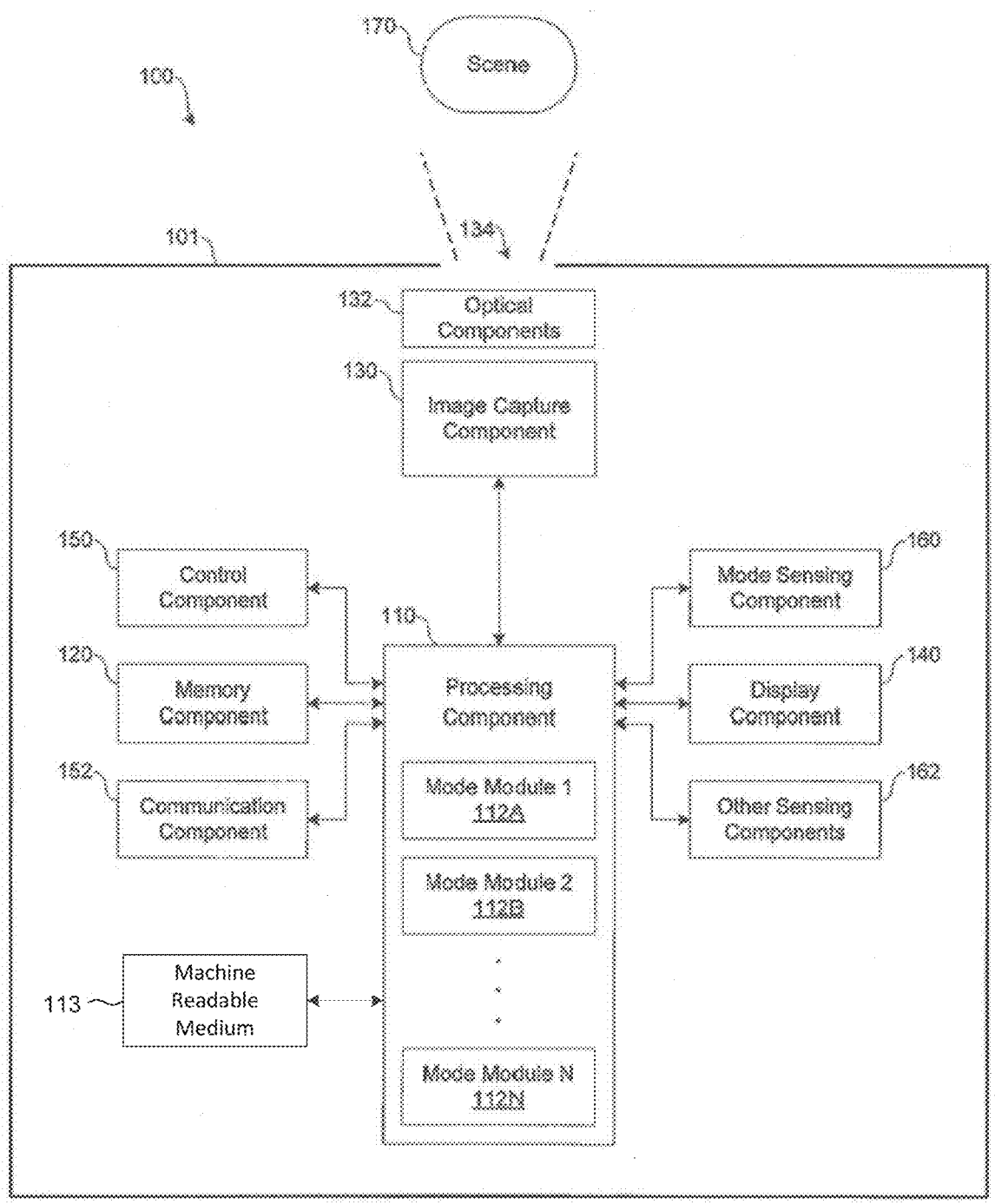
FIG. 1 illustrates a block diagram of an imaging system in accordance with an embodiment of the disclosure.

FIG. 1 illustrates a block diagram of an imaging system 100 in accordance with an embodiment of the disclosure. Imaging system 100 may be used to capture and process image frames in accordance with various techniques described herein. In one embodiment, various components of imaging system 100 may be provided in a housing 101, such as a housing of a camera, a personal electronic device (e.g., a mobile phone), or other system. In another embodiment, one or more components of imaging system 100 may be implemented remotely from each other in a distributed fashion (e.g., networked or otherwise).

In one embodiment, imaging system 100 includes a processing component 110, a memory component 120, an image capture component 130, optical components 132 (e.g., one or more lenses configured to receive electromagnetic radiation through an aperture 134 in housing 101 and pass the electromagnetic radiation to image capture component 130), a display component 140, a control component 150, a communication component 152, a mode sensing component 160, and a sensing component 162.

In various embodiments, imaging system 100 may implemented as an imaging device, such as a camera, to capture image frames, for example, of a scene 170 (e.g., a field of view). Imaging system 100 may represent any type of camera system which, for example, detects electromagnetic radiation (e.g., irradiance) and provides representative data (e.g., one or more still image frames or video image frames). For example, imaging system 100 may represent a camera that is directed to detect one or more ranges (e.g., wavebands) of electromagnetic radiation and provide associated image data. Imaging system 100 may include a portable device and may be implemented, for example, as a handheld device and/or coupled, in other examples, to various types of vehicles (e.g., a land-based vehicle, a watercraft, an aircraft, a spacecraft, or other vehicle) or to various types of fixed locations (e.g., a home security mount, a campsite or outdoors mount, or other location) via one or more types of mounts. In still another example, imaging system 100 may be integrated as part of a non-mobile installation to provide image frames to be stored and/or displayed.

Processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or or any other appropriate combination of processing device and/or memory to execute instructions to perform any of the various operations described herein. Processing component 110 is adapted to interface and communicate with components 120, 130, 140, 150, 160, and 162 to perform method and processing steps as described herein. Processing component 110 may include one or more mode modules 112A-112N for operating in one or more modes of operation (e.g., to operate in accordance with any of the various embodiments disclosed herein). In one embodiment, mode modules 112A-112N are adapted to define processing and/or display operations that may be embedded in processing component 110 or stored on memory component 120 for access and execution by processing component 110. In another aspect, processing component 110 may be adapted to perform various types of image processing techniques as described herein.

In various embodiments, it should be appreciated that each mode module 112A-112N may be integrated in software and/or hardware as part of processing component 110, or code (e.g., software or configuration data) for each mode of operation associated with each mode module 112A-112N, which may be stored in memory component 120. Embodiments of mode modules 112A-112N (i.e., modes of operation) disclosed herein may be stored by a machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of imaging system 100 and/or separate from imaging system 100, with stored mode modules 112A-112N provided to imaging system 100 by coupling the machine readable medium 113 to imaging system 100 and/or by imaging system 100 downloading (e.g., via a wired or wireless link) the mode modules 112A-112N from the machine readable medium (e.g., containing the non-transitory information). In various embodiments, as described herein, mode modules 112A-112N provide for improved camera processing techniques for real time applications, wherein a user or operator may change the mode of operation depending on a particular application, such as an off-road application, a maritime application, an aircraft application, a space application, or other application.

Memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 is adapted to execute software stored in memory component 120 and/or machine-readable medium 113 to perform various methods, processes, and modes of operations in manner as described herein.

Image capture component 130 includes, in one embodiment, one or more sensors (e.g., any type visible light, infrared, or other type of detector, including a detector implemented as part of a focal plane array) for capturing image signals representative of an image, of scene 170. In one embodiment, the sensors of image capture component 130 provide for representing (e.g., converting) a captured thermal image signal of scene 170 as digital data (e.g., via an analog-to-digital converter included as part of the sensor or separate from the sensor as part of imaging system 100).

Processing component 110 may be adapted to receive image signals from image capture component 130, process image signals (e.g., to provide processed image data), store image signals or image data in memory component 120, and/or retrieve stored image signals from memory component 120. Processing component 110 may be adapted to process image signals stored in memory component 120 to provide image data (e.g., captured and/or processed image data) to display component 140 for viewing by a user.

Display component 140 includes, in one embodiment, an image display device (e.g., a liquid crystal display (LCD)) or various other types of generally known video displays or monitors. Processing component 110 may be adapted to display image data and information on display component 140. Processing component 110 may be adapted to retrieve image data and information from memory component 120 and display any retrieved image data and information on display component 140. Display component 140 may include display electronics, which may be utilized by processing component 110 to display image data and information. Display component 140 may receive image data and information directly from image capture component 130 via processing component 110, or the image data and information may be transferred from memory component 120 via processing component 110.

In one embodiment, processing component 110 may initially process a captured thermal image frame and present a processed image frame in one mode, corresponding to mode modules 112A-112N, and then upon user input to control component 150, processing component 110 may switch the current mode to a different mode for viewing the processed image frame on display component 140 in the different mode. This switching may be referred to as applying the camera processing techniques of mode modules 112A-112N for real time applications, wherein a user or operator may change the mode while viewing an image frame on display component 140 based on user input to control component 150. In various aspects, display component 140 may be remotely positioned, and processing component 110 may be adapted to remotely display image data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, the one or more user-activated mechanisms of the control panel unit may be utilized to select between the various modes of operation, as described herein in reference to mode modules 112A-112N. In other embodiments, it should be appreciated that the control panel unit may be adapted to include one or more other user-activated mechanisms to provide various other control operations of imaging system 100, such as auto-focus, menu enable and selection, field of view (FoV), brightness, contrast, gain, offset, spatial, temporal, and/or various other features and/or parameters. In still other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a smart phone, a tablet, a personal digital assistant (e.g., a wireless, mobile device), a laptop computer, a desktop computer, or other type of device.

Mode sensing component 160 includes, in one embodiment, an application sensor adapted to automatically sense a mode of operation, depending on the sensed application (e.g., intended use or implementation), and provide related information to processing component 110. In various embodiments, the application sensor may include a mechanical triggering mechanism (e.g., a clamp, clip, hook, switch, push-button, or others), an electronic triggering mechanism (e.g., an electronic switch, push-button, electrical signal, electrical connection, or others), an electro-mechanical triggering mechanism, an electro-magnetic triggering mechanism, or some combination thereof. For example for one or more embodiments, mode sensing component 160 senses a mode of operation corresponding to the imaging system's 100 intended application based on the type of mount (e.g., accessory or fixture) to which a user has coupled the imaging system 100 (e.g., image capture component 130). Alternatively, the mode of operation may be provided via control component 150 by a user of imaging system 100 (e.g., wirelessly via display component 140 having a touch screen or other user input representing control component 150).

Furthermore in accordance with one or more embodiments, a default mode of operation may be provided, such as for example when mode sensing component 160 does not sense a particular mode of operation (e.g., no mount sensed or user selection provided). For example, imaging system 100 may be used in a freeform mode (e.g., handheld with no mount) and the default mode of operation may be set to handheld operation, with the image frames provided wirelessly to a wireless display (e.g., another handheld device with a display, such as a smart phone, or to a vehicle's display).

Mode sensing component 160, in one embodiment, may include a mechanical locking mechanism adapted to secure the imaging system 100 to a vehicle or part thereof and may include a sensor adapted to provide a sensing signal to processing component 110 when the imaging system 100 is mounted and/or secured to the vehicle. Mode sensing component 160, in one embodiment, may be adapted to receive an electrical signal and/or sense an electrical connection type and/or mechanical mount type and provide a sensing signal to processing component 110. Alternatively or in addition, as discussed herein for one or more embodiments, a user may provide a user input via control component 150 (e.g., a wireless touch screen of display component 140) to designate the desired mode (e.g., application) of imaging system 100.

Processing component 110 may be adapted to communicate with mode sensing component 160 (e.g., by receiving sensor information from mode sensing component 160) and image capture component 130 (e.g., by receiving data and information from image capture component 130 and providing and/or receiving command, control, and/or other information to and/or from other components of imaging system 100).

In various embodiments, mode sensing component 160 may be adapted to provide data and information relating to system applications including a handheld implementation and/or coupling implementation associated with various types of vehicles (e.g., a land-based vehicle, a watercraft, an aircraft, a spacecraft, or other vehicle) or stationary applications (e.g., a fixed location, such as on a structure). In one embodiment, mode sensing component 160 may include communication devices that relay information to processing component 110 via wireless communication. For example, mode sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, imaging system 100 may include one or more other types of sensing components 162, including environmental and/or operational sensors, depending on the sensed application or implementation, which provide information to processing component 110 (e.g., by receiving sensor information from each sensing component 162). In various embodiments, other sensing components 162 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 162 may include devices that relay information to processing component 110 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of imaging system 100 may be combined and/or implemented or not, as desired or depending on application requirements, with imaging system 100 representing various operational blocks of a system. For example, processing component 110 may be combined with memory component 120, image capture component 130, display component 140, and/or mode sensing component 160. In another example, processing component 110 may be combined with image capture component 130 with only certain operations of processing component 110 performed by circuitry (e.g., a processor, a microprocessor, a microcontroller, a logic device, or other circuitry) within image capture component 130. In still another example, control component 150 may be combined with one or more other components or be remotely connected to at least one other component, such as processing component 110, via a wired or wireless control device so as to provide control signals thereto.

In one embodiment, communication component 152 may be implemented as a network interface component (NIC) adapted for communication with a network including other devices in the network. In various embodiments, communication component 152 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 may include an antenna coupled thereto for wireless communication purposes. In other embodiments, the communication component 152 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the imaging system 100 may be associated with a particular network link such as for example a URL (Uniform Resource Locator), an IP (Internet Protocol) address, and/or a mobile phone number.

Figure 2:
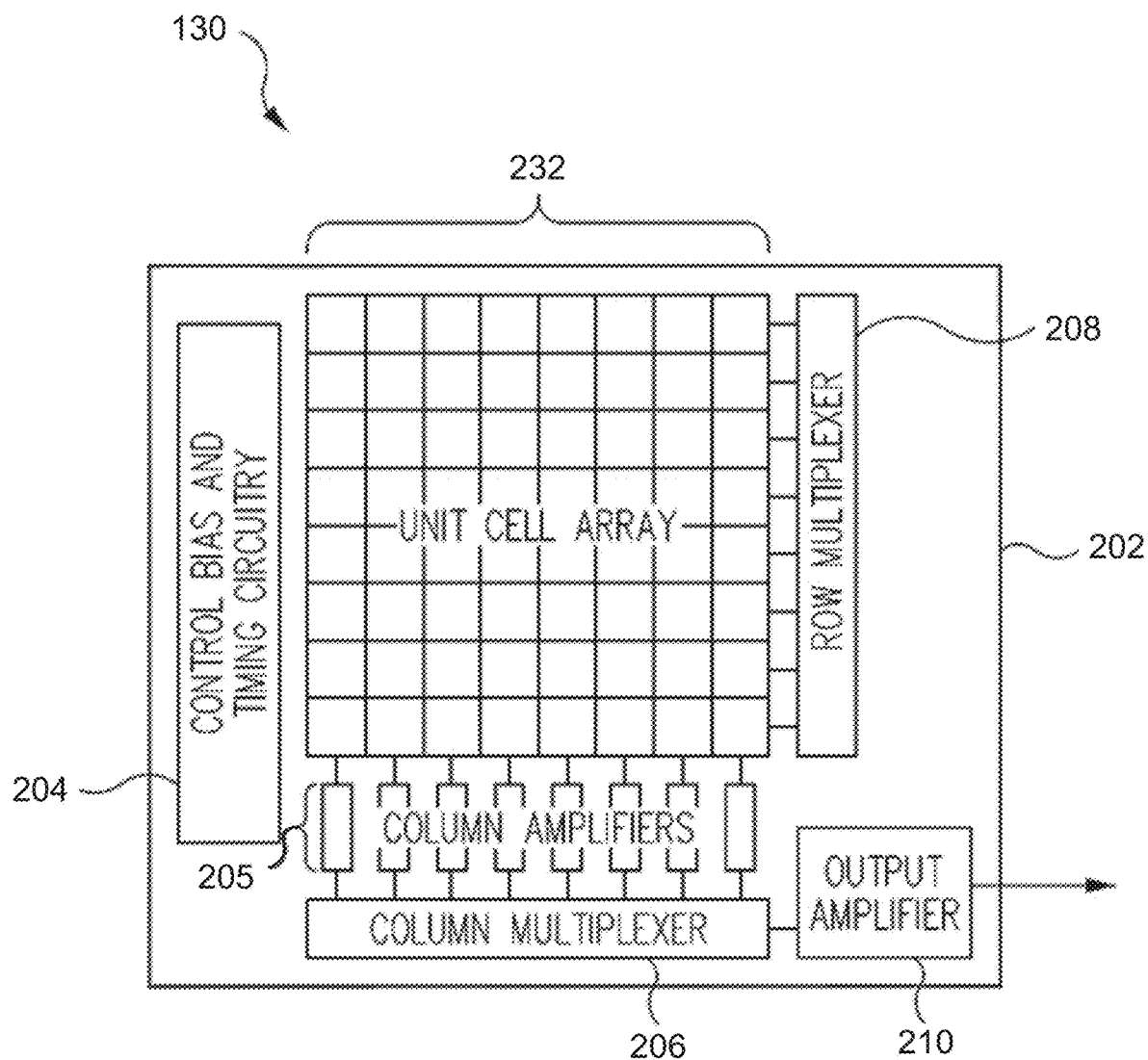
FIG. 2 illustrates a block diagram of an image capture component in accordance with an embodiment of the disclosure.

FIG. 2 illustrates a block diagram of image capture component 130 in accordance with an embodiment of the disclosure. In this illustrated embodiment, image capture component 130 is a focal plane array (FPA) including an array of unit cells 232 and a read out integrated circuit (ROIC) 202. Each unit cell 232 may be provided with an infrared detector (e.g., a microbolometer or other appropriate sensor) and associated circuitry to provide image data for a pixel of a captured thermal image frame. In this regard, time-multiplexed electrical signals may be provided by the unit cells 232 to ROIC 202.

ROIC 202 includes bias generation and timing control circuitry 204, column amplifiers 205, a column multiplexer 206, a row multiplexer 208, and an output amplifier 210. Image frames captured by infrared sensors of the unit cells 232 may be provided by output amplifier 210 to processing component 110 and/or any other appropriate components to perform various processing techniques described herein. Although an 8 by 8 array is shown in FIG. 2, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Figure 3:
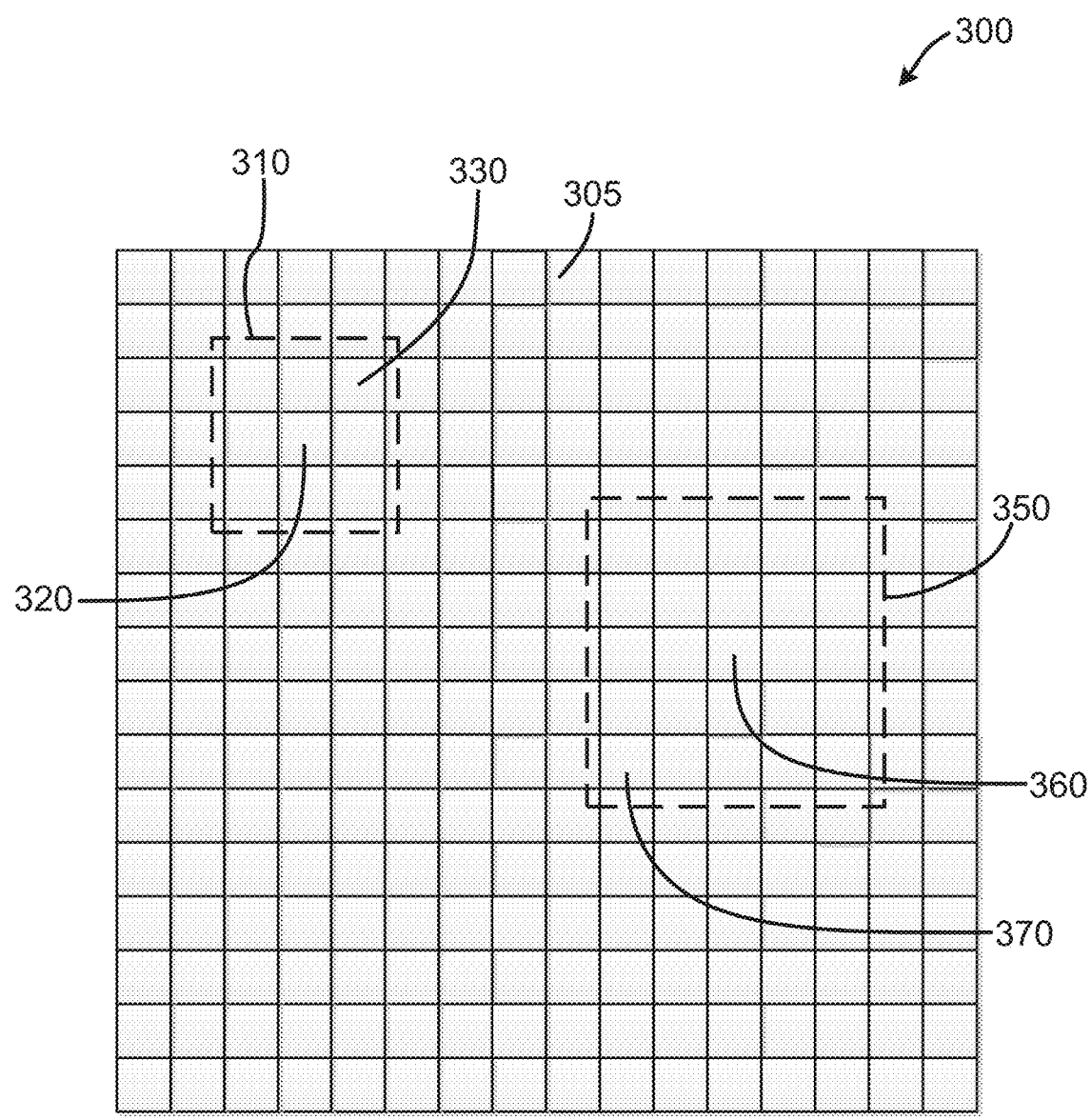
FIG. 3 illustrates an image frame in accordance with an embodiment of the disclosure.

FIG. 3 illustrates an image frame 300 provided by image capture component 130 in accordance with an embodiment of the disclosure. Although image frame 300 is represented as a 16 by 16 pixel image frame, any desired size may be used. As shown, image frame 300 includes a plurality of pixels 305 arranged in columns and rows. In accordance with anomalous detection techniques discussed herein, various groups (e.g., sets) of pixels may be identified, referred to as kernels. For example, FIG. 3 identifies a 3 by 3 pixel kernel 310 comprising a grid of pixels 305 having a center pixel 320 and 8 neighbor pixels 330. FIG. 3 also identifies a 5 by 5 pixel kernel 350 comprising a grid of pixels 305 having a center pixel 360 and 24 neighbor pixels 370.

Figure 4:
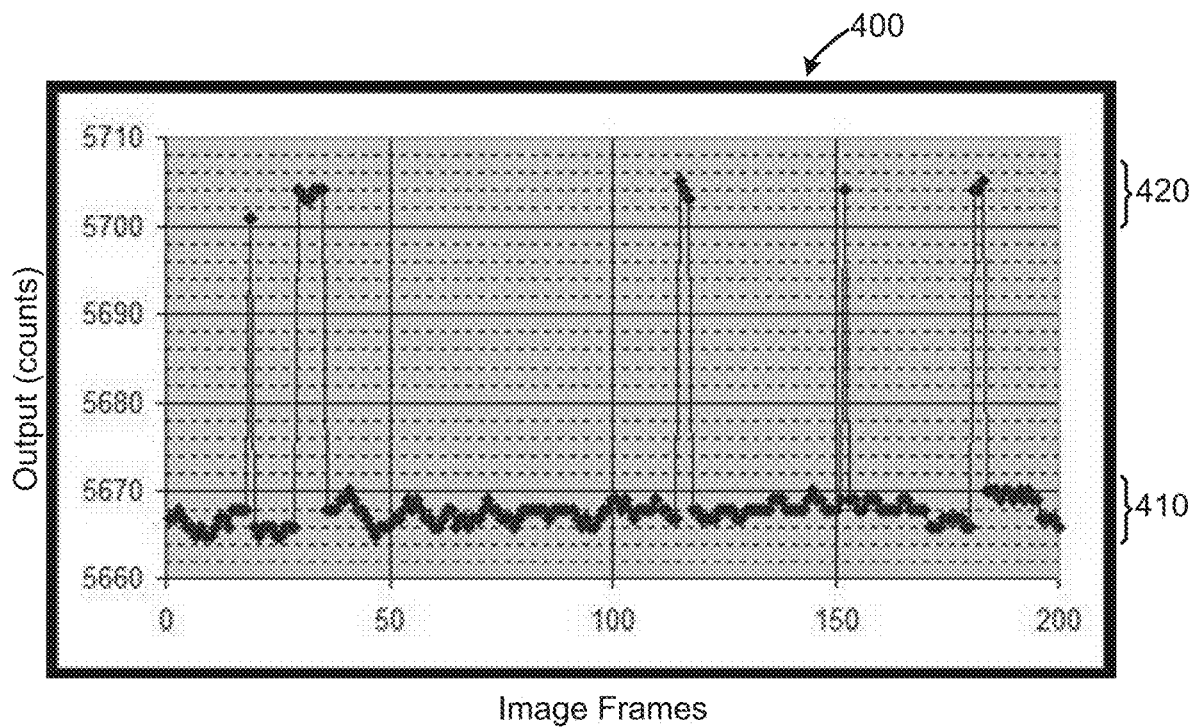
FIG. 4 illustrates an anomalous pixel response in accordance with an embodiment of the present disclosure.
Figure 5:
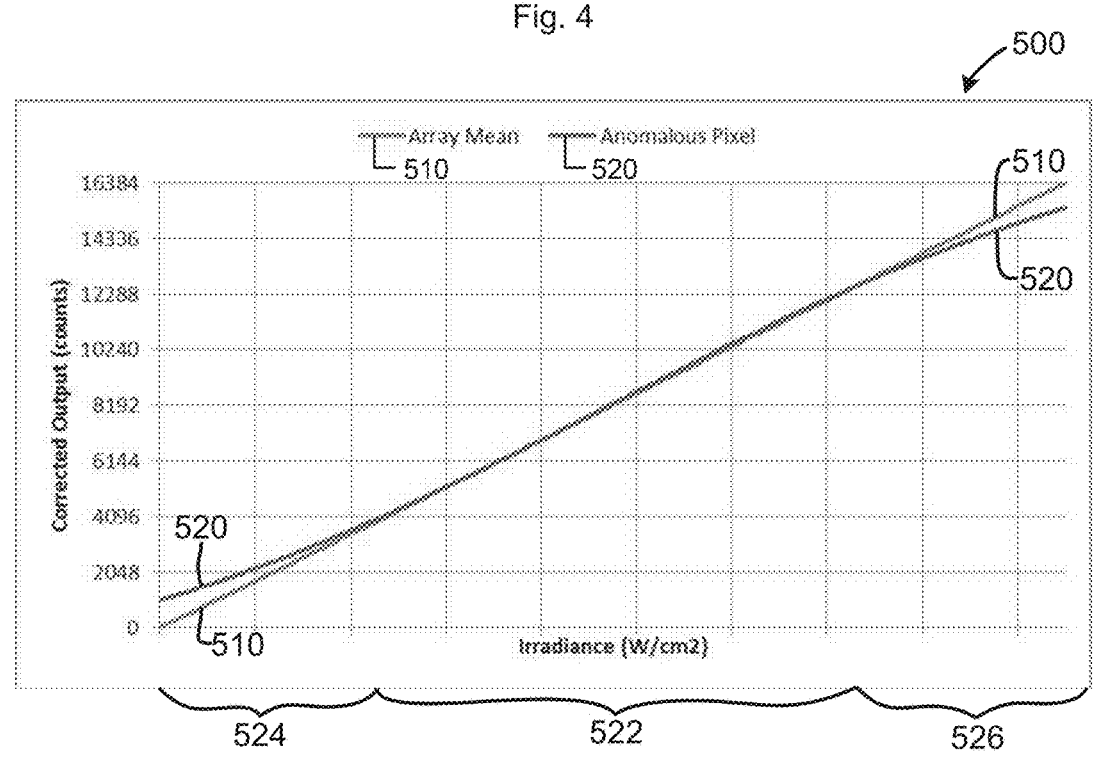
FIG. 5 illustrates another anomalous pixel response in comparison to a mean response of an array in accordance with an embodiment of the present disclosure.

As discussed, the present disclosure provides various techniques to identify pixels exhibiting anomalous behavior in captured image frames (e.g., image frame 300). Such anomalous behavior may be caused, for example, by defects, calibration errors, and/or other problems with the particular unit cell 232 within the FPA that is associated with the anomalous pixel. FIGS. 4 and 5 illustrate several types of anomalous behavior.

For example, FIG. 4 illustrates a plot 400 of the pixel values associated with a single pixel (e.g., pixel 320) over a plurality of image frames. As shown, for most image frames, pixel 320 exhibits a value (e.g., a particular number of counts) within a range 410 (e.g., 5665 to 5670 counts). However, for some image frames, the pixel value suddenly shifts to a different range 420 (e.g., 5700 to 5705 counts). This is temporal anomalous behavior associated with a flickering pixel (e.g., the sudden shifts in pixel values may appear as a flickering pixel in successive captured image frames when viewed by a user or processed by a machine).

FIG. 5 illustrates a plot 510 of the mean pixel values (e.g., counts) of all pixels (e.g., all 256 of pixels 305) in a plurality of image frames 300 captured in response to various irradiance levels (e.g., pixels 305 associated with all unit cells 232 of the FPA). As shown in plot 510, the mean pixel values increase with a particular slope in response to increasing irradiance levels.

FIG. 5 further illustrates a plot 520 of the pixel values associated with a particular one of the pixels (e.g., pixel 360) in a plurality of image frames. As shown in plot 520, the pixel 360 exhibits substantial overlap with the mean pixel value plot 510 for intermediate irradiance levels 522, but deviates from plot 510 for low irradiance levels 524 and high irradiance levels 526. This is spatial anomalous behavior (e.g., pixels that exhibit anomalous behavior in comparison to neighbor pixels in response to the same or similar irradiance).

Figure 6:
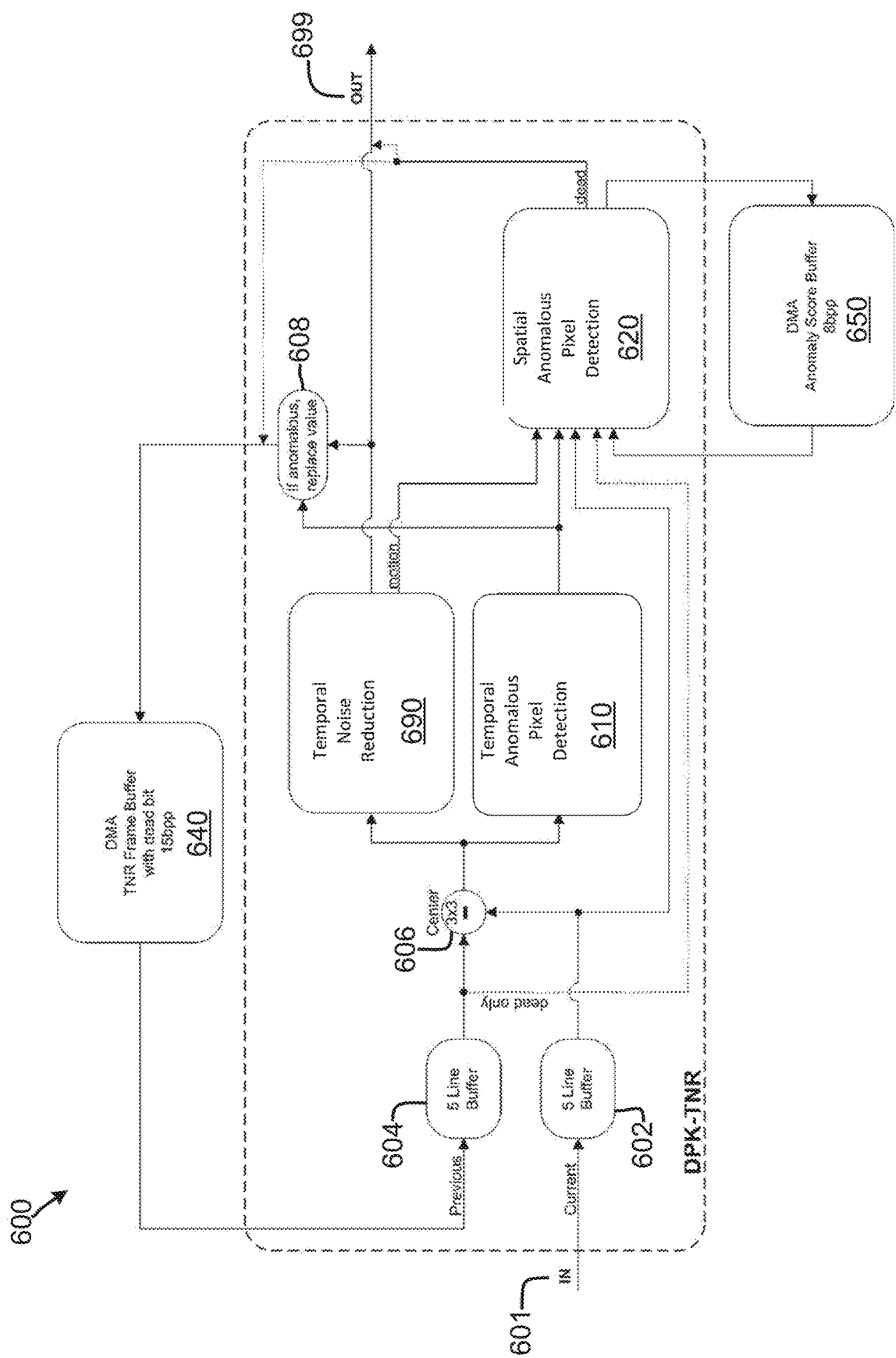
FIG. 6 illustrates a block diagram of image processing performed by the system of FIG. 1 in accordance with an embodiment of the disclosure.

FIG. 6 illustrates a block diagram 600 of image processing operations performed by the system of FIG. 1 in accordance with an embodiment of the disclosure. In some embodiments, operations identified in block diagram 600 may be performed by processing component 110, and data identified in block diagram 600 may be stored by memory component 120 and/or memory provided in other components (e.g., memory implemented as part of processing component 110).

As shown, block diagram 600 includes a temporal anomalous pixel detection block 610 and a spatial anomalous pixel detection block 620. Block diagram 600 further includes line buffers 602 and 604, a difference block 606, a replacement block 608, image frame buffers 640 and 650 (e.g., implemented using direct memory access (DMA) in some embodiments), an input port 601, a noise reduction block 690, and an output port 699.

A current image frame 300 provided by image capture component 130 is received at input port 601 and provided to line buffer 602. A previous image frame processed in accordance with FIG. 6 is stored in frame buffer 640 and provided to line buffer 604. In some embodiments, line buffers 602 and 604 store five lines (e.g., five rows or five columns) of the respectively provided image frames. These lines are differenced in block 606 to provide difference values for corresponding pixels of the buffered lines. For example, in a case where the buffered lines include kernel 310, differences between corresponding pixels 310/330 of the current image frame and the previously processed image frame are provided to processing blocks 610 and 620. Additional lines for the current image frame 300 and the previous image frame may be sequentially passed into line buffers 602 and 604 to process all pixels of the image frames.

Figure 7:
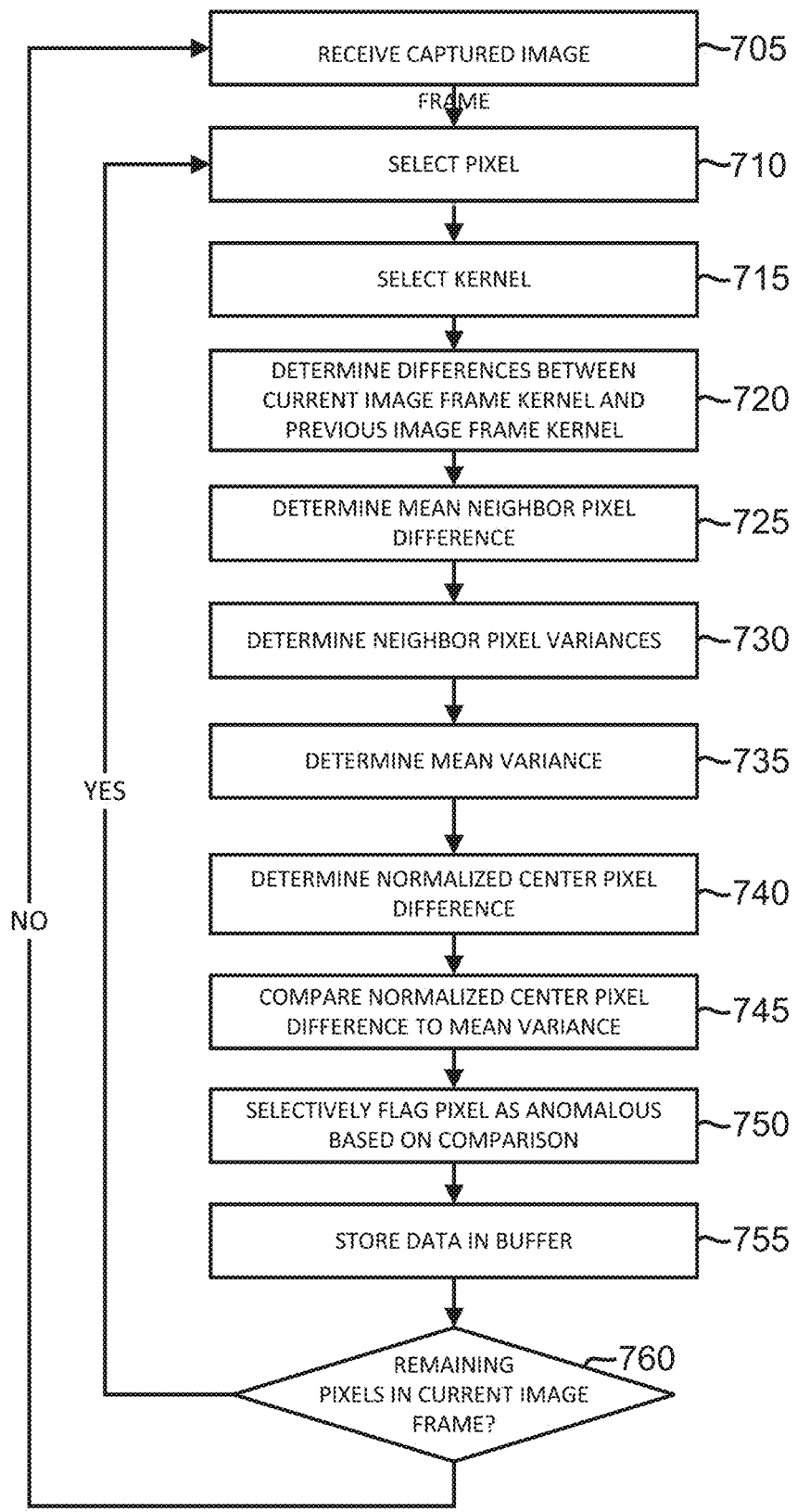
FIG. 7 illustrates a process of detecting anomalous pixels in accordance with an embodiment of the disclosure.

In temporal detection block 610, processing component 110 detects one or more flickering pixels exhibiting temporal anomalous behavior as further discussed herein with regard to FIG. 7 and various examples. If a temporally anomalous pixel is detected, then its value is replaced in block 608 (e.g., assigned a value associated with or calculated from one or more pixels of the current image frame or previous image frame) which is then used during further anomalous pixel detection operations. The current pixel value or replacement pixel value is provided to frame buffer 640 for storage.

In some embodiments, the replacement pixel value provided in block 608 is only a temporary replacement value used for further anomalous pixel detection operations (e.g., when the center pixel 320 becomes a neighbor pixel 330 in other kernels 310). In this regard, additional replacement operations may be performed by processing component 110 on the resulting image frame provided to output port 699.

Figure 9:
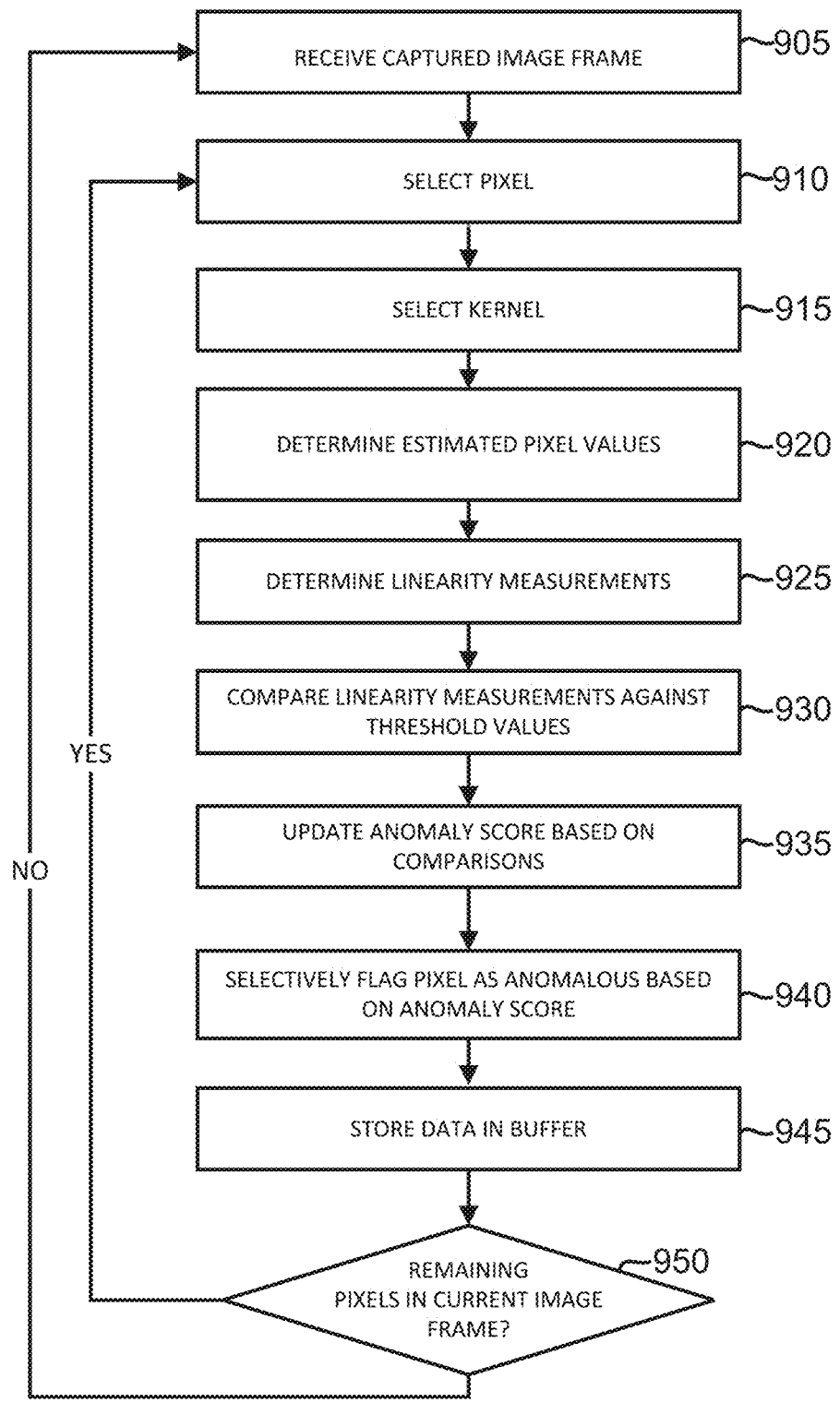
FIG. 9 illustrates another process of detecting anomalous pixels in accordance with an embodiment of the disclosure.

In spatial detection block 620, processing component 110 detects one or more pixels exhibiting spatial anomalous behavior as further discussed herein with regard to FIG. 9 and various examples. In this regard, spatial detection block 620 determines an anomaly score for each pixel of the current image frame based on linearity measurements determined from estimated and actual pixel values. These anomaly scores are stored in frame buffer 650 are used by spatial detection block 620 to detect spatial anomalous pixels when processing successive image frames. If a spatially anomalous pixel is detected, then it is identified (e.g., as a dead pixel) in frame buffer 640 for subsequent replacement or other processing.

By processing all pixels 305 through temporal detection block 610 and spatial detection block 620, a processed image frame can be stored in frame buffer 640 in which temporally anomalous pixels (e.g., flickering pixels) have been replaced and spatially anomalous pixels (e.g., pixels exhibiting anomalous behavior in comparison to neighbor pixels in response to the same or similar irradiance) have been identified.

In noise reduction block 690, the current image frame and the previous image frame (e.g., processed by temporal detection block 610 and spatial detection block 620) are respectively damped and averaged together to reduce temporal noise. In some embodiments, such temporal noise processing may use the kernel differences provided by block 606. The resulting noise-reduced image frame may be provided to output port 699 for further processing by processing component 110, display by display component 140, and/or other uses. For example, in some embodiments, the image frame provided to output port 699 may be further processed by processing component 110 to replace temporally anomalous pixels, spatially anomalous pixels, and/or other pixels identified as dead or abnormal.

In some embodiments, the operation of spatial detection block may be conditioned on motion detected by noise reduction block 690. For example, noise reduction block 690 may determine the presence of motion in captured images on a per-pixel basis based on a previous-to-current frame neighborhood difference (e.g., provided by difference block 606) being greater than a programmable motion threshold. Noise reduction block 690 may provide a motion detection flag to spatial detection block 620 (illustrated in FIG. 6) for the currently processed center pixel 350. In some embodiments, the center pixel 350 anomaly score (further discussed herein) may be updated by spatial detection score 620 only when motion has been detected.

FIG. 7 illustrates a process of detecting temporally anomalous pixels in accordance with an embodiment of the disclosure. FIGS. 8A-E illustrate various example pixel value calculations performed during the process of FIG. 7 in accordance with embodiments of the disclosure.

In block 705, image capture component 130 captures a current image frame 300 of scene 170 which is provided to processing component 110 (e.g., provided to line buffer 602 through input port 601).

In block 710, processing component 110 selects a pixel 320 of current image frame 300 to be analyzed for possible temporal anomalous behavior. In block 715, processing component 110 selects a kernel 310 (e.g., a 3 by 3 kernel) that includes pixel 320 (e.g., also referred to as a center pixel of kernel 310).

In block 720, processing component 110 determines pixel value differences between kernel 310 of current image frame 300 and a corresponding kernel of the previous processed image frame which is stored in frame buffer 640 and provided to line buffer 604. For example, in some embodiments, the operations of block 720 may be performed by difference block 606.

Referring to FIGS. 8A-E, kernel diagrams 810, 820, 830, 840, and 850 illustrate pixel differences determined in block 720 for various current and previous image frames. In particular, each of diagrams 810, 820, 830, 840, and 850 identify a difference determined for the center pixel 320 of the kernel 310, and 8 differences determined for the neighbor pixels 330 of the kernel 310.

In block 725, processing component 110 determines the mean of the neighbor pixel differences previously calculated in block 720. For example, the mean neighbor pixel differences for diagrams 810, 820, 830, 840, and 850 are 0, 0, −2, −8, and 12, respectively.

In block 730, processing component 110 determines a pixel variance for each of the neighbor pixels 330. The pixel variance values calculated in block 730 provide measurements of how much the frame-to-frame changes for each neighbor pixel 330 deviates from the overall frame-to-frame changes of the other neighbor pixels 330.

The pixel variances may be determined by subtracting the mean of neighbor pixel differences (e.g., determined in block 725) from each of the neighbor pixel differences (e.g., determined in block 720), and taking the absolute value of the result. For example, referring again to FIGS. 8A-E, kernel diagrams 815, 825, 835, 845, and 855 identify a pixel variance determined for each of neighbor pixels 330.

In block 735, processing component 110 determines the mean pixel variance (e.g., the mean of the pixel variances determined in block 730). The mean pixel variance value provides a measurement of the overall deviation of frame-to-frame changes among neighbor pixels 330. In some embodiments, a calculated mean pixel variance of 0 may be replaced with a minimum value of 0.5. For example, the mean pixel variances for diagrams 815, 825, 835, 845, and 855 are 1, 1, 10, 0.5, and 2, respectively.

In block 740, processing component 110 determines a normalized value for the center pixel difference previously calculated in block 720. The normalized center pixel value provides a measurement of the frame-to-frame differences of the center pixel 320 offset by the average differences of neighborhood pixels (e.g., to account for overall changes in the kernel 310).

The normalized center pixel difference may be determined by subtracting the neighborhood pixel differences mean (e.g., determined in block 725) from the center pixel difference (e.g., determined in block 720), and taking the absolute value of the result. For example, the normalized values for the center pixels 320 of diagrams 815, 825, 835, 845, and 855 are 3, 24, 26, 4, and 32, respectively.

In block 745, processing component 110 compares the normalized center pixel 320 difference (e.g., determined in block 740) with the mean pixel variance (e.g., determined in block 735). In some embodiments, block 745 may be performed by evaluating whether the following equation 1 is true:

|normalized_difference|>mean_variance*temporal_factor(equation 1)

In equation 1, the absolute value of the normalized center pixel 320 difference ("normalized_difference") is compared with the product of the mean pixel variance ("mean_variance") and a temporal factor ("temporal_factor"). The temporal factor may be used to adjust the determination performed in equation 1 on a frame by frame basis (e.g., provided by a user, system 100, or otherwise). For example, the temporal factor may be used to tune the results of temporal anomalous pixel detections based on experimental data to provide consistently desirable evaluations (e.g., preventing too many false positive or false negative evaluations of flickering pixels).

If equation 1 evaluates to true, then the center pixel is determined to be exhibiting temporal anomalous behavior (e.g., flickering). In this regard, if the center pixel's frame-to-frame difference is much greater than the pixel variance of neighbor pixels 330, then it is determined to be behaving anomalously and may be replaced.

The following Table 1 identifies the results of applying equation 1 to the examples in FIGS. 8A-E using a temporal factor value of 20. Other values for the temporal factor are also contemplated (e.g., 12):

TABLE 1

| Example | Normalized center pixel difference | Mean pixel variance | Equation 1 | Result |
| --- | --- | --- | --- | --- |
| FIG. 8A | 3 | 1 | 3 > 1*20 | False |
| FIG. 8B | 24 | 1 | 24 > 1*20 | True |
| FIG. 8C | 26 | 10 | 26 > 10*20 | False |
| FIG. 8D | 4 | 0.5 | 4 > 0.5*20 | False |
| FIG. 8E | 32 | 2 | 32 > 2*20 | False |

Thus, a temporally anomalous flickering pixel will be detected in the example of FIG. 8B (e.g., the center pixel's frame-to-frame difference is much greater than the pixel variance of its neighbor pixels, even when the pixel variance is corrected by the temporal factor). The center pixels referenced by FIGS. 8A and 8C-E would not be detected as temporally anomalous.

In block 750, processing component 110 selectively flags the center pixel 320 as temporally anomalous based on the comparison performed in block 745. Also in block 750, if the center pixel is flagged as temporally anomalous, then processing component 110 also replaces the center pixel's value with another value (e.g., in operation 608 as discussed). In block 755, the resulting center pixel value (e.g., the original value or replaced value) is stored in frame buffer 640 as discussed.

In block 760, if additional pixels remain to be evaluated for temporally anomalous behavior, then the process of FIG. 7 returns to block 710 where another pixel of image frame 300 is identified as a center pixel 320 for evaluation. Thus, processing component 110 may repeat operations 710 to 760 for all pixels of image frame 300. As a result, the entire image frame 300 may be evaluated for flickering pixels and the results of these determinations may be flagged and stored (e.g., in frame buffer 640) for further processing as desired. After all pixels of image frame 300 have been evaluated, then the process of FIG. 7 returns to block 705 where the next image frame is considered.

FIG. 9 illustrates another process of detecting spatially anomalous pixels in accordance with an embodiment of the disclosure. FIGS. 10, 11A-B, and 12A-B illustrate example pixel value calculations performed during the process of FIG. 9 in accordance with embodiments of the disclosure.

In block 905, image capture component 130 captures a current image frame 300 as discussed in relation to block 705. In block 910, processing component 110 selects a pixel 360 of current image frame 300 to be analyzed for possible spatial anomalous behavior. In block 915, processing component 110 selects a kernel 350 (e.g., a 5 by 5 kernel) that includes pixel 360 (e.g., also referred to as a center pixel of kernel 360).

Figure 10:
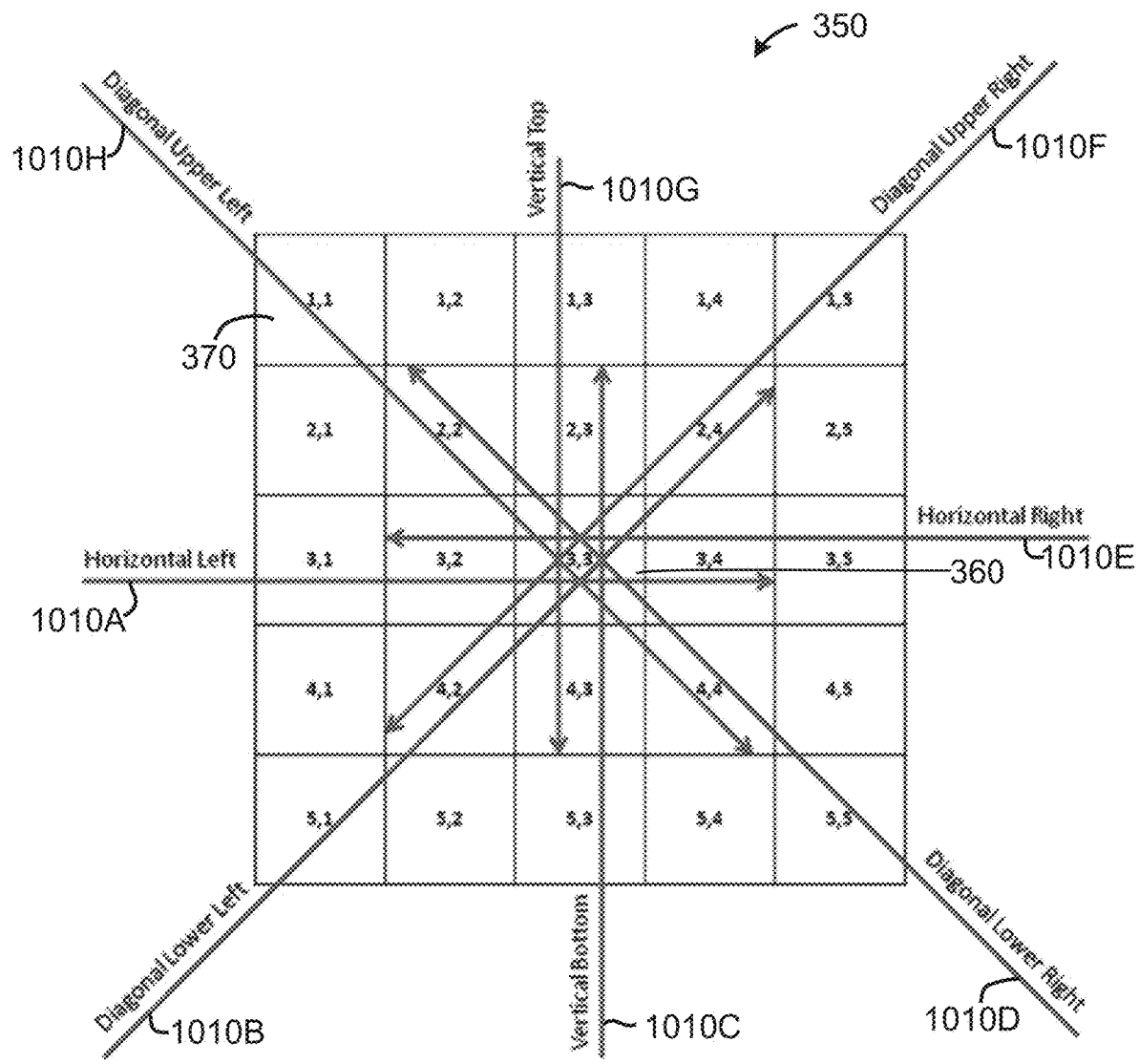
FIGS. 10, 11A-B, and 12A-B illustrate example pixel value calculations performed during the process of FIG. 9 in accordance with embodiments of the disclosure.

In block 920, processing component 110 determines estimated pixel values for various pixels of the selected kernel 350. For example, FIG. 10 illustrates kernel 350 with center pixel 360 and neighbor pixels 370. FIG. 10 further identifies 8 vectors 1010A-H, each of which originates at an outer neighbor pixel 370 and extends over 4 pixels including center pixel 360. For example, vector 1010A originates at a first pixel (labeled 3,1), and extends through a second pixel (labeled 3,2), a third pixel (labeled 3,3 corresponding to center pixel 360), and a fourth pixel (labeled 3,4).

Also in block 920, processing component calculates estimated values for the third and fourth pixels of each of vectors 1010A-H based on a linear extrapolation of the known values for the corresponding first and second pixels (e.g., using the slope defined by the first and second pixel values).

In some embodiments, the estimated third pixel value $P3_{est}$ may be determined by the following equation 2, where $P1_{val}$ and $P2_{val}$ are known values of the first and second pixels:

$$P3_{est} = -1*P1_{val} + 2*P2_{val} \quad \text{(equation 2)}$$

In some embodiments, the estimated fourth pixel value $P4_{est}$ may be determined by the following equation 3:

$$P4_{est} = -2*P1_{val} + 3*P2_{val} \quad \text{(equation 3)}$$

In block 925, processing component 110 determines linearity measurements (e.g., values) for each of vectors 1010A-G based on the estimated pixel values determined in block 920. For example, the linearity measurement for a given vector 1010 may be determined by the following equation 4, where $P3_{val}$ and $P4_{val}$ are known values of the third and fourth pixels:

$$\text{Linearity} = |P3_{val} - P3_{est}| - |P4_{val} - P4_{est}| \quad \text{(equation 4)}$$

Thus, in equation 4, the linearity measurement for each vector corresponds to how close the estimated third and fourth pixel values are in relation to the actual third and fourth pixel values. (e.g., the extent to which the actual values of the third and fourth pixels deviate from the expected linear extrapolated values). In this regard, positive linearity measurements are associated with the third pixel having a greater deviation than the fourth pixel, and negative linearity measurements are associated with the fourth pixel having a greater deviation than the third pixel.

Figures 11A, 11B:
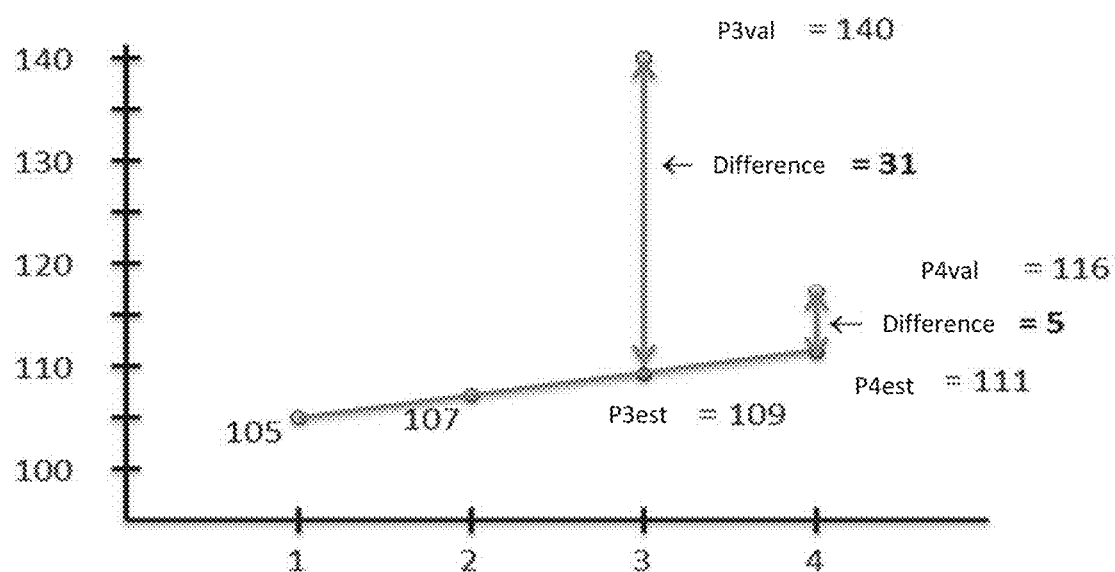

FIGS. 11A-B illustrate example pixel value calculations performed during the process of FIG. 9 in accordance with embodiments of the disclosure. Specifically, FIG. 11A illustrates an example set of actual values for pixels of kernel 350. FIG. 11B illustrates actual and estimated pixel values for vector 1010A of FIG. 11A, and the differences between actual and estimated values for the third and fourth pixels. Applying equation 4 to the values shown in FIGS. 11A-B results in a linearity measurement of 26 for vector 1010A (e.g., |140−109|−|116−111|).

Table 2 illustrates third and fourth pixel values and the resulting linearity measurements for each of vectors 1010A-H when applied to the example values shown in FIG. 11A.

TABLE 2

| Vector | $P3_{val}$ | $P3_{est}$ | $P4_{val}$ | $P4_{est}$ | Linearity |
|--------|-----------|-----------|-----------|-----------|-----------|
| 1010A | 140 | 109 | 116 | 111 | 26 |
| 1010B | 140 | 108 | 110 | 108 | 30 |
| 1010C | 140 | 116 | 98 | 109 | 13 |
| 1010D | 140 | 104 | 106 | 96 | 26 |
| 1010E | 140 | 112 | 107 | 108 | 27 |
| 1010F | 140 | 108 | 108 | 106 | 30 |
| 1010G | 140 | 106 | 123 | 114 | 25 |
| 1010H | 140 | 112 | 112 | 118 | 22 |

Figures 12A, 12B:
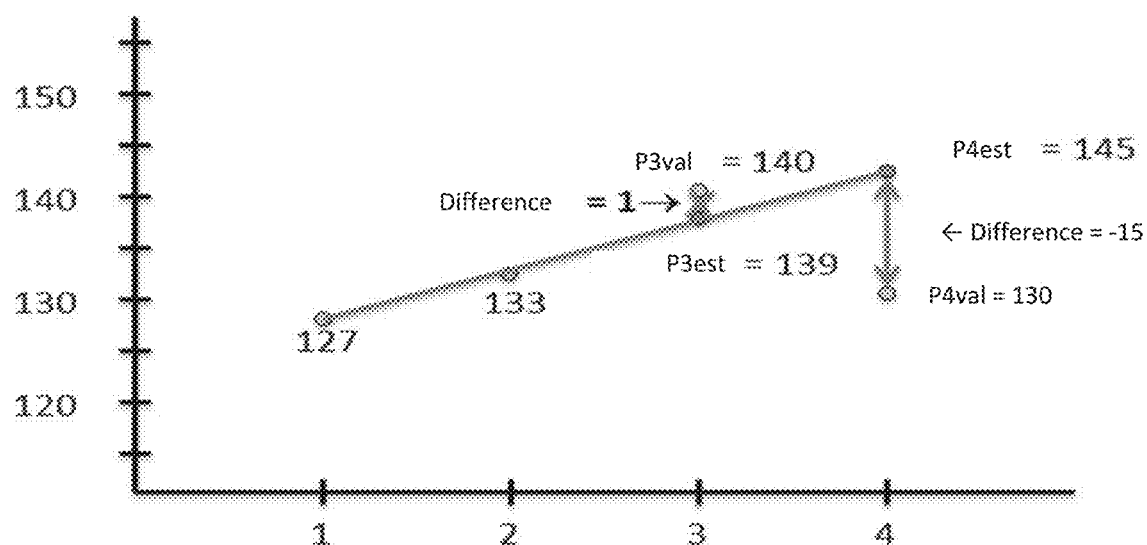

FIGS. 12A-B illustrate additional example pixel value calculations performed during the process of FIG. 9 in accordance with embodiments of the disclosure. Specifically, FIG. 12A illustrates another example set of actual values for pixels of kernel 350. FIG. 12B illustrates actual and estimated pixel values for vector 1010A of FIG. 12A, and the differences between actual and estimated values for the third and fourth pixels. Applying equation 4 to the values shown in FIGS. 12A-B, results in a linearity measurement of −14 for vector 1010A (e.g., |140−139|−|130−145|).

Table 3 illustrates third and fourth pixel values and the resulting linearity measurements for each of vectors 1010A-H when applied to the example values shown in FIG. 12A.

TABLE 3

| Vector | $P3_{val}$ | $P3_{est}$ | $P4_{val}$ | $P4_{est}$ | Linearity |
|--------|-----------|-----------|-----------|-----------|-----------|
| 1010A | 140 | 139 | 130 | 145 | −14 |
| 1010B | 140 | 141 | 137 | 147 | −9 |
| 1010C | 140 | 142 | 128 | 150 | −20 |
| 1010D | 140 | 136 | 130 | 143 | −9 |
| 1010E | 140 | 140 | 133 | 150 | −17 |
| 1010F | 140 | 142 | 135 | 147 | −10 |
| 1010G | 140 | 141 | 136 | 154 | −17 |
| 1010H | 140 | 141 | 129 | 152 | −22 |

In block 930, processing component 110 compares the linearity measurements against one or more threshold values. For example, in some embodiments, three threshold values may be used (e.g., low, medium, and high), each within a range of 0 to 32 (e.g., 10, 20, and 25, respectively). Greater or fewer thresholds may be used in other embodiments. Processing component 110 sums the number of linearity measurements that exceed each of the three thresholds (e.g., to obtain up to a maximum count of 8 for each of the three thresholds).

In some embodiments, linearity measurements may be selectively excluded from the threshold sums if dead pixels are present in their associated vectors (e.g., pixels previously detected as temporally anomalous, spatially anomalous, and/or otherwise abnormal in the current image frame 300 or in the previous image frame stored in frame buffer 640; as shown in FIG. 6, the identification of dead pixels may be passed from line buffer 604 to spatial detection block 620). For example, linearity measurements may be excluded from the high and medium threshold sums if any dead pixels are present in their associated vectors. In another example, up to three linearity measurements associated with vectors having one or more dead pixels may be included in the low threshold sum.

In block 935, processing component 110 updates an anomaly score based on the numbers of linearity measurements that exceed the various thresholds and stores the updated anomaly score in frame buffer 650. As discussed, spatial detection block 620 determines an anomaly score for each pixel of the current image frame 300. In some embodiments, the anomaly score may be updated in accordance with the following equation 5:

newScore=((32−$df$)*updateValue+$df$*prevScore)/32     (equation 5)

In equation 5, newScore is the updated anomaly score in a range from 0 to 255, df is a damping factor in a range from 0 to 32, updateValue is a score factor having a value of 255 or 0, and prevScore is the previous anomaly score in a range from 0 to 255.

Processing component 110 selects values for the damping factor and the score factor based on the calculated linearity measurements. In this regard, processing component 110 sums the number of linearity measurements that exceed each of the three thresholds (e.g., to obtain up to a maximum count of 8 for each of the three thresholds) and selects values for the damping factor and the score factor based on the sums. For example, Table 4 identifies damping factor and score factor values selected for various linearity measurement sums that exceed the various high, medium, and low thresholds.

TABLE 4

| Degree of Non-Linearity | High Threshold | Medium Threshold | Low Threshold | Damping Factor df | Score Factor updateValue |
|---|---|---|---|---|---|
| extreme | 8 | 8 | 8 | 6 | 255 |
| significant | ≥7 | 8 | 8 | 19 | 255 |
| marginal | ≥6 | ≥7 | 8 | 26 | 255 |
| no detection | other | other | other | 24 | 0 |

As shown in Table 4, the degree of non-linearity exhibited by the third pixel (e.g., center pixel 360 of kernel 350) may be determined by the various threshold counts which result in different values being assigned to the damping factor and score factor values used in equation 5. For example, in cases of greater non-linearity, low values for damping factor df will tend to pull the updated anomaly score newScore up toward the score factor updateValue of 255. However, in other cases, high values for damping factor df will tend to pull the updated anomaly score newScore down.

In block 940, processing component 110 selectively flags the center pixel 360 as spatially anomalous based on the updated anomaly score. In this regard, processing component 110 compares the updated anomaly score with an anomaly score threshold (e.g., a threshold in the range of 0 to 255, such as 217 in some embodiments). If the updated anomaly score exceeds the anomaly score threshold, then the center pixel 360 will be deemed spatially anomalous. In block 945, this determination is stored in frame buffer 640. The anomaly score (and therefore the spatial anomalous determination) associated with center pixel 360 may change over time as successive image frames are evaluated and the anomaly score is pulled up and down based on the linearity measurements performed on the actual and estimated pixel values of kernel 350.

In some embodiments, the number of successive image frames processed before a temporally anomalous pixel determination is made can depend on the linearity of the imaged scene (e.g., scene 170). For example, the more linear the scene, the more certain that a non-linear center pixel 360 can be identified through high linearity measurement calculations. In this regard, the updated anomaly score can be quickly pulled above the anomaly score threshold if center pixel 360 consistently exhibits non-linear behavior in relation to neighbor pixels 370. For less linear scenes, greater numbers of image frames and/or greater non-linear offsets of center pixel 360 may be needed to pull the updated anomaly score above the anomaly score threshold.

In block 950, if additional pixels remain to be evaluated for spatially anomalous behavior, then the process of FIG. 9 returns to block 910 where another center pixel 360 of image frame 300 is selected. Thus, processing component 110 may repeat operations 910 to 950 for all pixels of image frame 300. As a result, the entire image frame 300 may be evaluated for spatially anomalous pixels and the results of these determinations may be flagged and stored (e.g., in frame buffer 640) for further pixel replacement operations or other processing. After all pixels of image frame 300 have been evaluated, then the process of FIG. 9 returns to block 905 where the next image frame is considered.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
   receiving first and second image frames comprising a plurality of pixels, wherein the first and second image frames are thermal image frames;
   selecting kernels of the first and second image frames, wherein each kernel comprises a center pixel and a plurality of neighbor pixels;
   comparing a frame-to-frame change of the center pixels with frame-to-frame changes of the neighbor pixels; and
   selectively detecting at least one of the center pixels as a temporally anomalous flickering pixel based on the comparing.

2. The method of claim 1, wherein the comparing comprises comparing a normalized difference of the center pixels to a mean variance of the neighbor pixels.

3. The method of claim 2, further comprising calculating the normalized difference using the frame-to-frame change of the center pixels and the frame-to-frame changes of the neighbor pixels.

4. The method of claim 2, further comprising calculating the mean variance from a plurality of variance values associated with the neighbor pixels.

5. The method of claim 4, further comprising calculating the variance values using the frame-to-frame changes of the neighbor pixels.

6. The method of claim 1, wherein the kernels are grids of three pixels by three pixels.

7. The method of claim 1, further comprising assigning a replacement value to the center pixel of at least one of the image frames in response to the detecting.

8. The method of claim 1, further comprising repeating the selecting, comparing, and detecting for a plurality of different kernels of the first and second image frames to consider a corresponding plurality of center pixels for temporally anomalous flickering pixel behavior.

9. A method comprising:
   receiving an image frame comprising a plurality of pixels;
   selecting a kernel of the image frame, wherein the kernel comprises a center pixel and a plurality of neighbor pixels;
   determining a plurality of linearity measurements based on the center pixel and the neighbor pixels;
   updating a spatial anomaly score based on the linearity measurements; and
   selectively detecting the center pixel as a spatially anomalous pixel by comparing the spatial anomaly score to a spatial anomaly score threshold.

10. The method of claim 9, wherein the determining comprises:
    calculating a plurality of estimated values for the center pixel using a plurality of corresponding subsets of the neighbor pixels; and
    comparing the estimated values to one or more linearity threshold values to determine the linearity measurements.

11. The method of claim 9, wherein the determining comprises:
    identifying a plurality of vectors each comprising the center pixel and a corresponding subset of the neighbor pixels;
    for each vector, calculating an estimated value of the center pixel using the corresponding subset of the neighbor pixels; and
    comparing the estimated values to one or more linearity threshold values to determine the linearity measurements.

12. The method of claim 9, further comprising repeating the method for a plurality of image frames to update the spatial anomaly score in response to each image frame.

13. The method of claim 9, wherein the kernels are grids of five pixels by five pixels.

14. The method of claim 9, further comprising assigning a replacement value to the center pixel in response to the detecting.

15. The method of claim 9, further comprising repeating the selecting, determining, and detecting for a plurality of different kernels of the image frame to consider a corresponding plurality of center pixels of the image frame for spatially anomalous pixel behavior.

16. The method of claim 9, wherein the image frame is a thermal image frame.

17. A method comprising:
    receiving first and second image frames comprising a plurality of pixels;
    selecting kernels of the first and second image frames, wherein each kernel comprises a center pixel and a plurality of neighbor pixels;
    comparing a frame-to-frame change of the center pixels with frame-to-frame changes of the neighbor pixels, wherein the comparing comprises comparing a normalized difference of the center pixels to a mean variance of the neighbor pixels; and
    selectively detecting at least one of the center pixels as a temporally anomalous flickering pixel based on the comparing.

18. The method of claim 17, further comprising calculating the normalized difference using the frame-to-frame change of the center pixels and the frame-to-frame changes of the neighbor pixels.

19. The method of claim 17, further comprising calculating the mean variance from a plurality of variance values associated with the neighbor pixels.

20. The method of claim 19, further comprising calculating the variance values using the frame-to-frame changes of the neighbor pixels.

* * * * *

UNITED STATES PATENT AND TRADEMARK OFFICE
CERTIFICATE OF CORRECTION

PATENT NO. : 11,012,648 B2
APPLICATION NO. : 16/543300
DATED : May 18, 2021
INVENTOR(S) : Joseph Kostrzewa et al.

Page 1 of 1

It is certified that error appears in the above-identified patent and that said Letters Patent is hereby corrected as shown below:

In the Specification

In Column 1, Lines 6-7 change "patent application Ser. No." to --Patent Application No.--.

In Column 1, Line 10 change "patent application Ser. No." to --Patent Application No.--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*